UNITED STATES PATENT OFFICE.

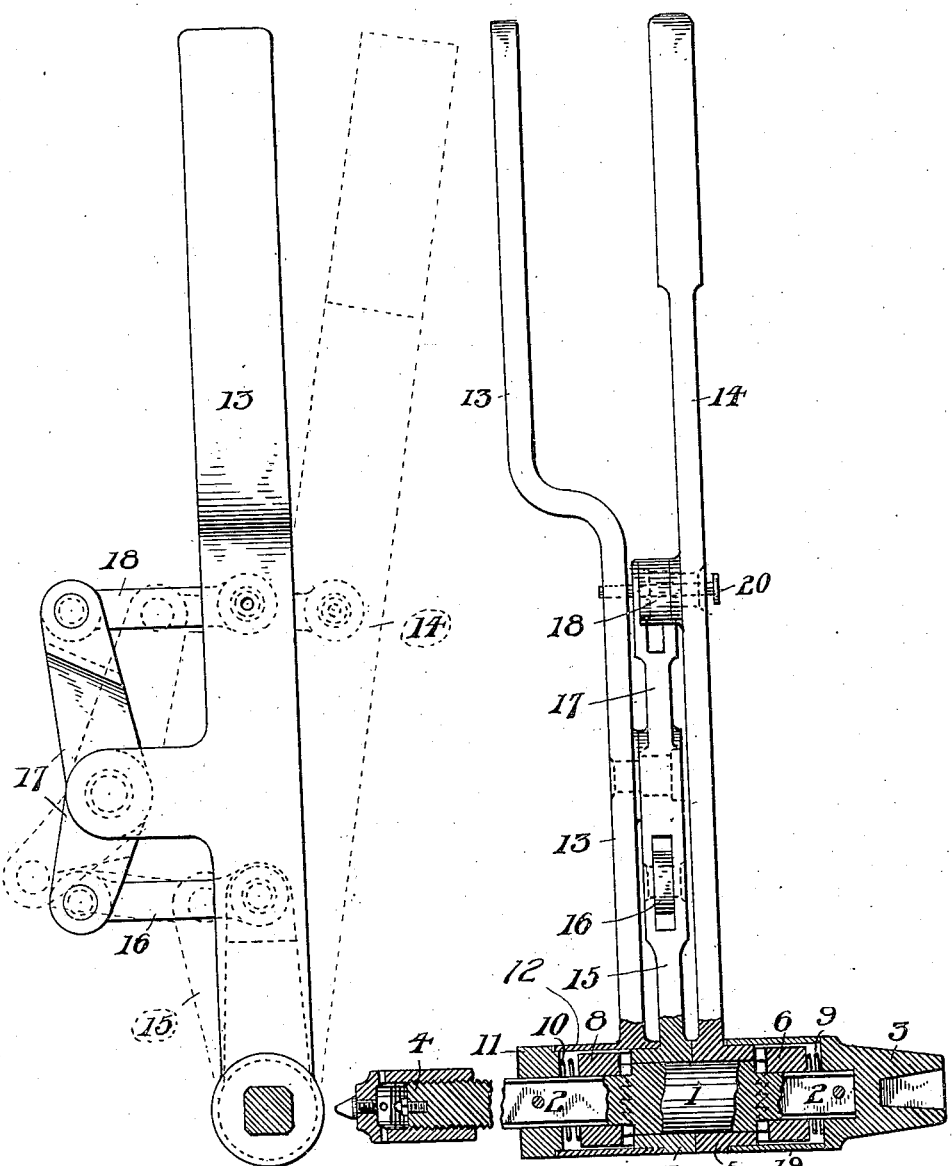

JAMES H. AIKEN, OF INGRAM, AND THOMAS McG. AIKEN, OF ALLEGHENY, PENNSYLVANIA.

RATCHET-DRILL.

No. 843,513.

Specification of Letters Patent.

Patented Feb. 5, 1907.

Application filed May 22, 1905. Serial No. 261,581.

*To all whom it may concern:*

Be it known that we, JAMES H. AIKEN and THOMAS McG. AIKEN, citizens of the United States, residing at Ingram and Allegheny, in the county of Allegheny and State of Pennsylvania, have invented certain new and useful Improvements in Ratchet-Drills; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to new, novel, and useful improvements in a double-actuated and operated ratched drill, and has for its object the combination and arrangement of parts whereby the drill head or socket is made to operate in one continuous direction.

In the accompanying drawings we have illustrated our device by several views.

Figure 1 is a view in elevation and partly in section of the device; Fig. 2, a front elevation, the ratchet means of operating the drill-socket being shown in the horizontal section; Fig. 3, a detached view of two rotating ratchet members, also a view of one of the said members.

Numerals of reference designate like parts throughout the different views, 1 being the drill-stock, the central portion thereof being round and the ends 2 2 made square. Secured to one end of the stock is a drill-socket 3, having a chambered portion to receive the squared end of the tool, and on the opposite end is arranged a device 4, by means of which the tool may be fed to the work. Seated over the central round portion of the stock is a collar 5, having angled teeth 5' formed in the outer rim. These teeth mesh in similar angled teeth formed in a collar 6, seated over the square portions of the stock. A collar 7, also seated over the round portion of the stock, has angled teeth formed in the outside rim and made the reverse of those formed on the collar 5. These teeth mesh in similar angled teeth formed on the collar 8, seated on the squared portion 2 of the stock. Seated over the squared portion 2 of the said stock and having a bearing against the drill-socket 3 and collar 6 is a tension-spring 9, while a similar spring 10 is seated over the squared portion 2 between the collar 8 and a brace 11, secured to the portion 2. A sleeve 12, formed integral with a lever 13 and seated over the collars 7 and 8, acts as a guard to prevent dirt, &c., from entering the parts.

Formed integral with the collar 5 is an operating-lever 14, and also integral with the collar 7 is a short-arm lever 15. This latter lever is connected by a short link 16 with a bell-lever 17, pivoted to an extension on the lever 13, which is in turn connected by another short link 18 with the operating-lever 14, being pivotally attached to the latter. A sleeve 19 prevents dirt, &c., from lodging around the collar 6 and spring 9.

The levers 13 and 14 are alternately drawn back and forth. The movement of the lever 14 toward the operator causes the collar 5 to revolve and by means of the tooth connection with the stock causes said stock to rotate. The teeth of the collar 5 mesh with the teeth of the collar 6, and it is such arrangement that causes the lever 14 to rotate the stock in one direction. During this movement of the lever 14 the collar 7, connected to the short lever 15, rotates in a direction opposite to that of the collars 5 and 6, and by reason of the reverse inclination of the teeth on the collars 7 and 8 with relation to the teeth on the collars 5 and 6 the collar 8 is pushed against the tension of the spring 10, and thereby the collar 8 is permitted to rotate idly on the stock 1. When the lever 14 is moved in an opposite direction, the collar 5 slips idly over the collar 6 or the teeth thereon and the collar 7 operatively engages the collar 8 through the medium of the teeth thereon. By this arrangement a continuous movement is imparted to the stock 1. The bell-lever and links cause the collar 7 to rotate in a direction opposite to that of the collar 5.

The form of drill construction as described above may be operated by two persons at the same time. Thus a much greater force can be utilized where the boring is difficult.

Should it be desired to operate both the levers 13 and 14 jointly in the same direction, they can be connected by any desired means, such as the pin 20, (shown in Fig. 2,) and the same results will be accomplished as the alternating movement of the levers.

Having thus fully described our invention, what we claim as new, and wish to secure by Letters Patent, is—

1. In combination, a stock having end portions therefor angular in section, collars on the stock, levers carried by the collars, collars slidable on the angular portions of the stock, teeth on the sliding collars normally engaging the teeth of the first-named collars, springs for holding the teeth in mesh, a sleeve for the stock, a lever carried by the sleeve and a connection between the lever of the sleeve and the levers of the collars for imparting a continuous movement to the stock and means carried by the stock for holding the tool.

2. In combination, a stock, collars on the stock, levers carried by the collars, teeth on the collars, collars slidable on the stock, teeth on the sliding collars normally engaging the teeth of the first-named collars, springs for holding the teeth of the sliding collars normally in mesh with the teeth of the first-named collars, a sleeve for the stock, a lever on the sleeve, a projection on the lever of the sleeve, a bell-lever pivoted to the projection, a lever pivoted at one end to the bell-lever and at the opposite end of one of the levers of the collars and a lever pivoted at one end to the opposite end of the bell-lever and at the opposite end to the lever of the remaining collar and means carried by the stock for holding the tool.

In testimony whereof we affix our signatures in presence of two witnesses.

JAMES H. AIKEN.
THOMAS McG. AIKEN.

Witnesses:
Wm. W. Powell, Jr.,
Frank H. Fulmer.